United States Patent [19]
Taniguchi

[11] Patent Number: 5,406,834
[45] Date of Patent: Apr. 18, 1995

[54] TORQUE SENSOR

[75] Inventor: Manabu Taniguchi, Yamatotakada, Japan

[73] Assignee: Koyo Seiko Co., Ltd., Osaka, Japan

[21] Appl. No.: 114,205

[22] Filed: Aug. 30, 1993

[30] Foreign Application Priority Data

Sep. 7, 1992 [JP] Japan .................. 4-265297

[51] Int. Cl.6 .......................................... G01M 15/00
[52] U.S. Cl. ..................................... 73/118.1; 73/1 C
[58] Field of Search ........... 73/118.1, 862.23, 862.193, 73/1 C; 180/132, 79.1

[56] References Cited

U.S. PATENT DOCUMENTS

| 4,830,137 | 5/1989 | Tatemoto et al. ................. 180/79.1 |
| 4,984,647 | 1/1991 | Morishita et al. ................. 180/79.1 |
| 5,039,926 | 8/1991 | Morishita et al. . | |

FOREIGN PATENT DOCUMENTS

| 321662 | 6/1989 | European Pat. Off. . |
| 2-40517 | 2/1990 | Japan . |
| 2040517 | 2/1990 | Japan . |
| 2163625 | 6/1990 | Japan . |
| WO91/04474 | 4/1991 | Japan . |
| 4-85136 | 7/1992 | Japan . |
| 2211943 | 7/1989 | United Kingdom . |

Primary Examiner—Robert Raevis
Attorney, Agent, or Firm—Darby & Darby

[57] ABSTRACT

In a torque sensor, an oscillating voltage from an oscillator is applied to a torque detecting coil and a temperature compensating coil, and voltages from the torque detecting coil and the temperature compensating coil are input to a differential amplifier which produces a differential-amplified voltage for detection of a torque, wherein when the oscillator has ceased producing the oscillating voltage, a prescribed voltage is applied to a circuit through which the voltage from the torque detecting coil or the temperature compensating coil is input to the differential amplifier, thereby causing the differential amplifier to output a voltage shifted outside a prescribed range and thus detecting a failure of the oscillator.

15 Claims, 2 Drawing Sheets

TORQUE SENSOR

BACKGROUND OF THE INVENTION

1. Field of the Invention

The present invention relates to a torque sensor, and more particularly to a torque sensor suitable for use in a vehicle power steering system and the like.

2. Description of Related Art

A power steering system which provides steering assisting power for a vehicle incorporates a torque sensor that detects a torque exerted on the steering shaft when the steering wheel is turned; based on the torque detected by the torque sensor, a motor is actuated to assist the steering force.

FIG. 1 is a block diagram showing the configuration of a prior art torque sensor. An oscillator 110 produces an oscillating voltage which is passed through a buffer circuit 113 and applied to a torque detecting coil 114 and a temperature compensating coil 115 through respective voltage dividing resistors $R_0$ and $R_0$. The torque detecting coil 114, which is mounted in encircling relationship to a steering shaft (not shown), is so constructed that its impedance changes according to the torque exerted on the steering shaft and to the ambient temperature. An AC voltage generated in the torque detecting coil 114 is supplied to clamp circuits 118 and 119. The temperature compensating coil 115, which is also mounted in encircling relationship to the steering shaft, is so constructed that its impedance changes according to the ambient temperature. An AC voltage generated in the temperature compensating coil 115 is supplied to clamp circuits 116 and 117.

Output voltages of the clamp circuits 116 and 118 are input to peak detectors 120 and 121, respectively, and output voltages from the peak detectors 120 and 121 are input to a differential amplifier 124. Likewise, output voltages of the clamp circuits 117 and 119 are input to peak detectors 122 and 123, respectively, and output voltages from the peak detectors 122 and 123 are input to a differential amplifier 125. The differential amplifiers 124 and 125 are also supplied with offset voltages output from offset voltage generators ill and 112, respectively. The differential amplifier 124 outputs a torque signal $S_{T1}$, an output voltage representing the detected torque; the differential amplifier 125 outputs a torque signal $S_{T2}$, an output voltage representing the detected torque.

In the torque sensor of the above configuration, when the oscillator 110 is energized, the oscillating voltage produced is applied through the buffer circuit 113 to the torque detecting coil 114 and the temperature compensating coil 115. As a result, the torque detecting coil 114 generates an AC voltage which varies with the ambient temperature as well as with the torque exerted from the steering wheel; the AC voltage thus generated is supplied to the clamp circuits 118 and 119. On the other hand, the AC voltage generated in the temperature compensating coil 115 varies with the ambient temperature and is supplied to the clamp circuits 116 and 117.

The clamp circuits 116, 117, 118, and 119 each clamp the voltage by applying such a bias that the voltage waveform is shifted to the positive voltage side until the maximum negative value of the input AC voltage becomes equal to 0 V. The output voltages of the clamp circuits 116 and 118 are fed to the peak detectors 120 and 121, respectively, while the output voltages of the clamp circuits 117 and 119 are fed to the peak detectors 122 and 123, respectively. Each of the peak detectors 120, 121, 122, and 123 detects the peak value of the input AC voltage.

The output voltages of the peak detectors 120 and 121 are input to the differential amplifier 124, and the output voltages of the peak detectors 122 and 123 are input to the differential amplifier 125. The differential amplifier 124 amplifies the difference between the voltages applied from the peak detectors 120 and 121, and adds the offset voltage to the result. Likewise, the differential amplifier 125 amplifies the difference between the voltages applied from the peak detectors 122 and 123, and adds the offset voltage to the result. Accordingly, the differential amplifiers 124 and 125 produce output voltages respectively offset against the voltage associated with the ambient temperatures of the torque detecting coil 114 and the temperature compensating coil 115, thus obtaining two output voltages, i.e. the torque signals $S_{T1}$ and $S_{T2}$, proportional to the torque applied. The offset voltages are applied to set the torque signals, $S_{T1}$ and $S_{T2}$, to the midpoint of the torque signal when no torque is applied.

Therefore, when no torque is applied, the output voltages of the differential amplifiers 124 and 125 correspond to the respective offset voltages; on the other hand, when a torque is applied, the output voltage changes in increasing or decreasing direction with respect to the offset voltage according to the direction of the applied torque, based on which the steering direction and the applied torque are detected. The torque signals $S_{T1}$ and $S_{T2}$, proportional to the detected torque, are then applied to a power steering control circuit (not shown). Based on one or other of the applied torque signals, $S_{T1}$ or $S_{T2}$, the power steering control circuit controls the rotation of the motor to assist the steering force. If the voltage difference between the torque signals $S_{T1}$ and $S_{T2}$ becomes greater than a prescribed value, then the situation is determined as an erroneous detection of the torque due to a failure in the torque detected, detector, and control of the motor to assist the steering force is stopped.

When a torque is being exerted by steering action at the steering wheels, if the oscillating voltage disappears due to a failure of the oscillator 110, the AC voltages both in the torque detecting coil 114 and the temperature compensating coil 115 will also disappear if this happens, the torque signals being output from the differential amplifiers 124 and 125 both return to the offset voltage, i.e. the midpoint voltage of the torque signal which is normally obtained when no torque is applied, and as a result, control of the motor rotation to assist the steering force is turned off. Even when [he oscillator 110 fails, the power steering control circuit continues to operate with the output voltages of the differential amplifiers 124, 125 both set at the midpoint voltage of the torque signal. If the oscillator 110 resumes normal operation due to some cause, the differential amplifiers 124 and 125 again output torque signals proportional to the torque being exerted, based on which signals the rotation of the steering assisting motor is controlled. Thus, in cases in which the oscillator 110 intermittently fails, control of the motor rotation to assist the steering force becomes intermittent, which hampers stable steering operation.

SUMMARY OF THE INVENTION

It is an object of the invention to provide a torque sensor capable of detecting a failure of an oscillator in case the oscillator fails.

It is another object of the invention to provide a torque sensor which is capable of obtaining a signal signifying the detection of a failure of an oscillator in case the oscillator fails, and of disabling the control operation of the steering assisting motor based on that signal.

It is a further object of the invention to provide a torque sensor which ensures stable steering operation by preventing the rotation of the steering assisting motor from being controlled intermittently when the oscillator fails intermittently.

According to the invention, there is provided a torque sensor in which an oscillating voltage produced by an oscillator is supplied to a torque detecting coil and a temperature compensating coil, and voltages from the torque detecting coil and the temperature compensating coil are input to a differential amplifier that produces a differential-amplified voltage for detection of a torque, having a voltage supply circuit for applying a prescribed voltage to a circuit through which the voltage from the torque detecting coil or the temperature compensating coil voltage is input to the differential amplifier, wherein when the oscillating voltage from the oscillator disappears, the output voltage of the differential amplifier is shifted outside a prescribed range by the application of the voltage output from the voltage supply circuit.

When the oscillating voltage produced by the oscillator is applied to the torque detecting coil and the temperature compensating coil, the torque detecting coil generates a voltage proportional to the torque being exerted and the ambient temperature, and the temperature compensating coil generates a voltage proportional to the ambient temperature. By differential-amplifying the voltages output from the torque detecting coil and the temperature compensating coil, a voltage is obtained which varies within a prescribed range according to the applied torque. When the oscillating voltage from the oscillator disappears, the voltage supply circuit applies a prescribed voltage to one or other of the voltages to be differential-amplified, so that the differential-amplified voltage is shifted outside the prescribed range. A failure of the oscillator can thus be detected by the amount of the variation of the differential-amplified voltage.

The above and further objects and features of the invention will more fully be apparent from the following detailed description with accompanying drawings.

DESCRIPTION OF THE PREFERRED EMBODIMENTS

The present invention will be described in detail below with reference to the accompanying drawing showing one embodiment.

Figure 1:
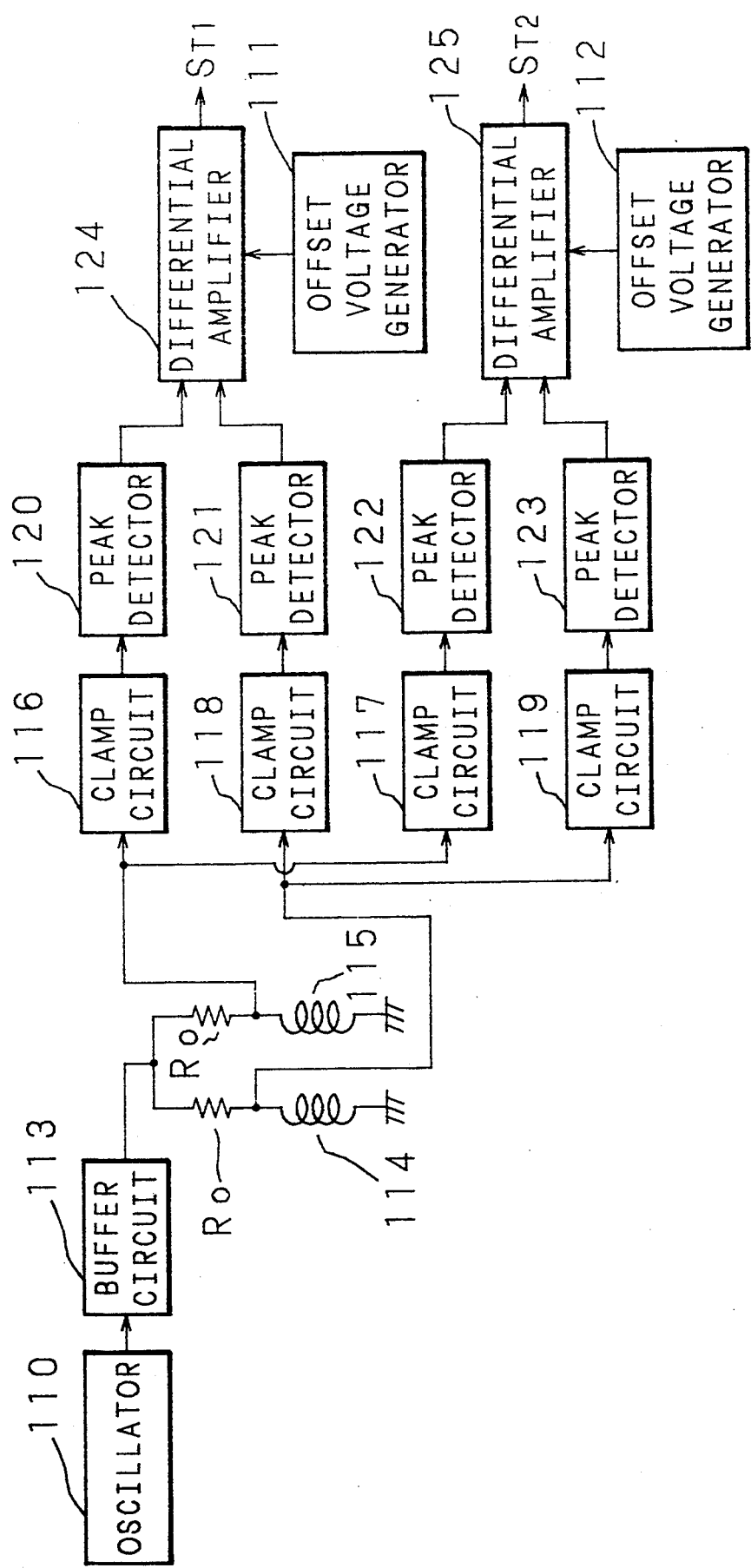
FIG. 1 is a block diagram showing the configuration of a prior art torque sensor.
Figure 2:
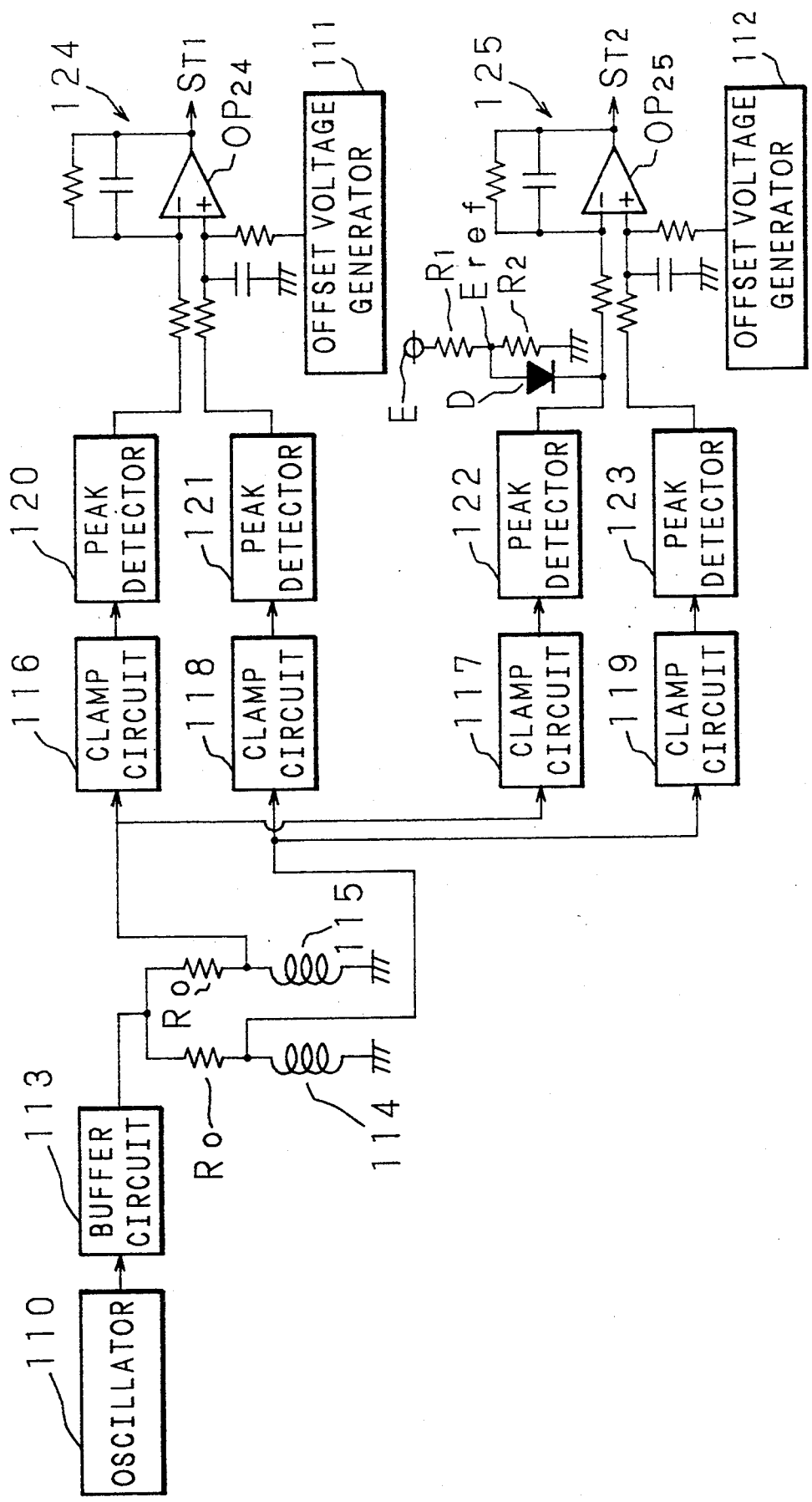
FIG. 2 is a block diagram showing the configuration of a torque sensor according to the present invention.

FIG. 2 is a block diagram showing the configuration of a torque sensor according to the invention. An oscillator 110 produces an oscillating voltage which is passed through a buffer circuit 113 and applied to a torque detecting coil 114 and a temperature compensating coil 115 through respective voltage dividing resistors $R_0$ and $R_0$. The torque detecting coil 114, which is mounted in encircling relationship to a steering shaft (now shown), is so constructed that its impedance changes according the ambient temperature and the torque exerted on the steering shaft. An AC voltage generated in the torque detecting coil 114 is supplied to clamp circuits 118 and 119.

The temperature compensating coil 115, which is also mounted in encircling relationship to the steering shaft, is so constructed that its impedance changes according to the ambient temperature. An AC voltage generated in the temperature compensating coil 115 is supplied to clamp circuits 116 and 117. Output voltages of the clamp circuits 116 and 118 are input to peak detectors 120 and 121, respectively, and output voltages of the peak detectors 120 and 121 are respectively input to an inverting input terminal "−" and an noninverting input terminal "+" of an op-amp (operational amplifier) $OP_{24}$ in a differential amplifier 124.

Likewise, output voltages of the clamp circuits 117 and 119 are input to peak detectors 122 and 123, respectively, and output voltages of the peak detectors 122 and 123 are respectively input to an inverting input terminal "−" and an noninverting input terminal "+" of an op-amp $OP_{25}$ in a differential amplifier 125. The noninverting input terminals "+" of the op-amps $OP_{24}$ and $OP_{25}$ are also supplied with an offset voltage from respective offset voltage generators 111 and 112. The differential amplifier 124 outputs a torque signal $S_{T1}$, an output voltage representing the detected torque, while the differential amplifier 125 outputs a torque signal $S_{T2}$, an output voltage representing the detected torque. The inverting input terminal "−" of the op-amp $OP_{25}$ is also supplied with a reference voltage $E_{ref}$, a voltage obtained by dividing a power supply voltage E through voltage dividing resistors $R_1$ and $R_2$. The reference voltage $E_{ref}$ is chosen to be slightly lower than the voltage applied to the inverting input terminal "−" during the oscillating operation of the oscillator 110.

Next, the operation of the above torque sensor will be described.

When the oscillator 110 is energized, the oscillating voltage produced is applied to the torque detecting coil 114 and the temperature compensating coil 115. As a result, AC voltages are generated in the torque detecting coil 114 and the temperature compensating coil 115. The AC voltage generated in the torque detecting coil 114 varies with the ambient temperature and the torque exerted on the steering shaft when the steering wheel is turned; this AC voltage is supplied to the clamp circuits 118 and 119. On the other hand, the AC voltage generated in the temperature compensating coil 115 varies with the ambient temperature; this AC voltage is supplied to the clamp circuits 116 and 117.

The clamping circuits 116, 117, 118, and 119 each clamp the voltage by applying such a bias that the voltage waveform is shifted to the positive voltage side until the maximum negative value of the input AC voltage becomes equal to 0 V. The output voltages of the clamp circuits 116 and 118 are supplied as inputs to the peak detectors 120 and 121, respectively, while the output voltages of the clamp circuits 117 and 119 are supplied as inputs to the peak detectors 122 and 123, respectively. Each of the peak detectors 120, 121, 122, and 123 detects the peak value of the input AC voltage.

The output voltages of the peak detectors 120 and 121 are respectively applied to the inverting and noninverting input terminals "−" and "+" of the op-amp OP24 in the differential amplifier 124. Likewise, the output voltages of the peak detectors 122 and 123 are respectively applied to the inverting and noninverting input terminals "−" and "+" of the op-amp OP25 in the differential amplifier 125. The differential amplifier 124 amplifies the difference between the voltages applied from the peak detectors 120 and 121, and adds the offset voltage to the result. The differential amplifier 125 amplifies the difference between the voltages applied from the peak detectors 122 and 123, and adds the offset voltage to the result. Accordingly, the differential amplifiers 124 and 125 produce output voltages respectively offset against the voltage associated with the ambient temperatures of the torque detecting coil 114 and the temperature compensating coil 115, thus obtaining two output voltages proportional to the torque being exerted on the steering shaft, i.e. the torque signals $S_{T1}$ and $S_{T2}$.

During the oscillating operation of the oscillator 110, since AC voltages are generated in the torque detecting coil 114 and the temperature compensating coil 115, the inverting input terminal "−" of the op-amp OP25 in the differential amplifier 125 is held at a voltage related to the AC voltage in the temperature compensating coil 115. Therefore, the diode D remains OFF, and a voltage related to the reference voltage $E_{ref}$ is not applied to the inverting input terminal "−" of the op-amp OP25 in the differential amplifier 125.

More specifically, when no torque is applied, the output voltages of the differential amplifiers 124 and 125 correspond to the respective offset voltages; on the other hand, when a torque is applied, the output voltage changes in increasing or decreasing direction with respect to the offset voltage according to the direction of the torque, based on which the steering direction and the applied torque are detected. When the torque signals $S_{T1}$ and $S_{T2}$, proportional to the detected torque, are applied to a power steering control circuit (not shown), the power steering control circuit controls the rotation of the steering assisting motor on the basis of the torque signal $S_{T1}$, for example. If the voltage difference between the torque signals $S_{T1}$ and $S_{T2}$ becomes greater than a prescribed value, then the situation is determined as an erroneous detection of the torque due to a failure in the torque detector, and control of the motor rotation to assist the steering force is stopped, thus preventing the steering force from being assisted on the basis of the erroneously detected torque.

When the oscillator 110 fails and the oscillating voltage has disappeared, the AC voltages in the torque detecting coil 114 and the temperature compensating coil 115 are reduced to 0 V. As a result, the output voltages of the peak detectors 120, 121, 122, and 123 drop nearly to 0 V. When the output voltage of the peak detector 122 drops nearly to 0 V, the diode D is ON, and a voltage equal to the reference voltage $E_{ref}$ derived through the voltage dividing resistors $R_1$ and $R_2$ and subtracted by the forward voltage drop of the diode D is applied to the inverting input terminal "−" of the op-amp OP25 in the differential amplifier 125.

In this case, the differential amplifier 124 outputs the torque signal $S_{T1}$ corresponding to the offset voltage; on the other hand, since the voltage equal to the reference voltage $E_{ref}$ minus the forward voltage drop of the diode D is applied to the inverting terminal "−" of the op-amp OP25, the output voltage of the differential amplifier 125 becomes nearly 0 V, thus producing a torque signal $S_{T2}$ shifted outside the voltage change range of the normal torque signal $S_{T2}$ that varies with the applied torque. This results in a large voltage difference between the torque signals $S_{T1}$ and $S_{T2}$, thus detecting the failure of the oscillator 110, i.e. the oscillator 110 having ceased its oscillating operation. Based on this voltage difference between the torque signals $S_{T1}$ and $S_{T2}$, the power steering control circuit determines that the oscillator 110 has failed, and stops controlling the rotation of the steering assisting motor on the basis of the torque signal $S_{T1}$; thus, once the oscillator 110 has failed, the steering assisting motor remains deactuated. Therefore, even if the oscillator 110 recovers from failure intermittently, the steering assisting motor will not be actuated intermittently each time the oscillator 110 recovers from failure. This ensures stable steering operation.

In this embodiment, a voltage based on the reference voltage is applied to the inverting input terminal of the op-amp in the differential amplifier, but in an alternative configuration, this voltage may be applied to the noninverting input terminal. In this latter case, the output voltage of the differential amplifier will become substantially shifted in the positive direction outside the voltage change range of the output signal obtained in proportion to the applied torque, and a large voltage difference between the two torque signals will be detected, as in the above-described embodiment.

As described above, according to the torque sensor of the invention, when the oscillator that applies the oscillating voltage to the torque detecting coil and the temperature compensating coil has failed and the oscillating voltage has disappeared, the failure can be detected accordingly. Therefore, after the oscillator has failed, the steering assisting motor is disabled by the signal by which the failure has been detected. The invention thus provides a torque sensor of high reliability that ensures stable steering operation by preventing the steering assisting motor from being actuated each time the oscillator recovers from failure.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A torque sensor for a motor operated power steering system in which an oscillating voltage from an oscillator is supplied to a torque detecting coil and a temperature compensating coil, and voltages from said torque detecting coil and said temperature compensating coil are input to a differential amplifier that produces a differential-amplified voltage for detection of a torque, comprising:
   a voltage source,
   a pull-up circuit for applying a prescribed voltage from said voltage source to a circuit through which the voltage from said torque detecting coil or said temperature compensating coil is input to said differential amplifier
   when said oscillator has ceased producing the oscillating voltage to shift the output voltage of said differential amplifier outside a prescribed voltage range in which the motor operates the power steering system.

2. A torque sensor according to claim 1, wherein said torque sensor is mounted in a power steering apparatus that provides steering assisting power for a vehicle.

3. A torque sensor for detecting a torque, comprising:
means for producing an oscillating voltage;
a first coil to which the oscillating voltage is applied and which produces a first voltage corresponding to the torque to be detected and an ambient temperature;
a second coil to which the oscillating voltage is applied and which produces a second voltage corresponding to an ambient temperature;
means for differential-amplifying the first and said second voltages input thereto;
a voltage source; and
pull-up circuit means for applying a prescribed voltage from said voltage source to a circuit interposed between said first coil and said differential amplifying means, or to a circuit interposed between said second coil and said differential amplifying means, when said oscillating means has ceased producing the oscillating voltage.

4. A torque sensor according to claim 3, wherein said voltage source produces the prescribed voltage which is a constant voltage smaller in magnitude than a voltage input to said differential amplifying means during the oscillating operation of said oscillating means; and said pull-up circuit means includes:
a diode inserted in a path connecting said voltage source with the circuit interposed between said first coil and said differential amplifying means or with the circuit interposed between said second coil and said differential amplifying means.

5. A torque sensor according to claim 3, further comprising:
means for providing an offset voltage to said differential amplifying means.

6. A torque sensor according to claim 3, wherein said first coil and said second coil are mounted in encircling relationship to a steering shaft, and said torque sensor detects a torque exerted on the steering shaft.

7. A torque sensor for detecting a torque, comprising:
means for producing an oscillating voltage;
a first coil to which the oscillating voltage is applied and which produces a first voltage corresponding to the torque to be detected and an ambient temperature;
a second coil to which the oscillating voltage is applied and which produces a second voltage corresponding to an ambient temperature;
two differential amplifying means for differential-amplifying said first and said second voltages input thereto; and
pull-up circuit means for applying a prescribed voltage to a circuit interposed between said first coil and one of said differential amplifying means, or to a circuit interposed between said second coil and one of said differential amplifying means, when said oscillating means has ceased producing the oscillating voltage to shift the output of the differential amplifier to which the prescribed voltage is applied outside a prescribed voltage range.

8. A torque sensor according to claim 7, wherein said pull-up circuit means includes:
means for generating a constant voltage that is smaller in magnitude than a voltage input to one of said differential amplifying means during the oscillating operation of said oscillating means; and
a diode inserted in a path connecting said constant voltage generating means with the circuit interposed between said first coil and one of said differential amplifying means or with the circuit interposed between said second coil and one of said differential amplifying means, said diode becoming conductive when the oscillating voltage ceases.

9. A torque sensor according to claim 7, further comprising:
means each for providing an offset voltage to one and the other of said differential amplifying means, respectively.

10. A torque sensor according to claim 7, wherein said first coil and said second coil are mounted in encircling relationship to a steering shaft, and said torque sensor detects a torque exerted on the steering shaft.

11. A torque sensor for detecting a torque, comprising:
means for producing an oscillating voltage;
a first coil to which the oscillating voltage is applied and which produces a first voltage corresponding to the torque to be detected and an ambient temperature;
a second coil to which the oscillating voltage is applied and which produces a second voltage corresponding to an ambient temperature;
first detecting means for detecting the maximum value of the first voltage;
second detecting means for detecting the maximum value of the second voltage;
an operational amplifier for accepting a detected voltage from said first detecting means at one of a noninverting input terminal and an inverting input terminal and a detected voltage from said second detecting means at the other of the noninverting and inverting input terminal, and for differential-amplifying the two input voltages;
means for producing a constant voltage of a magnitude smaller than the oscillating voltage input to an operational amplifier during operation of said oscillating means;
a diode connected to one of the noninverting or inverting input terminal of said operational amplifier for applying the constant voltage to the noninverting or inverting input terminal of said operational amplifier when the oscillating operation of said oscillating means ceases.

12. A torque sensor according to claim 11, further comprising:
means for providing an offset voltage to the noninverting input terminal of said operational amplifier.

13. A torque sensor according to claim 11, wherein said torque sensor is mounted in a power steering apparatus for providing steering assisting power for a vehicle, and detects a torque exerted on a steering shaft when a steering wheel of the vehicle is turned.

14. A torque sensor for detecting a torque exerted on a steering shaft, comprising:
means for producing an oscillating voltage;

a first coil mounted in encircling relationship to the steering shaft for producing a first voltage corresponding to the torque exerted and an ambient temperature when the oscillating voltage is applied;

a second coil mounted in encircling relationship to the steering shaft for producing a second voltage corresponding to an ambient temperature when the oscillating voltage is applied;

two first clamping means for clamping the first voltage;

two second clamping means for clamping the second voltage;

two first detecting means for detecting a peak voltage from an output of each of said first clamping means;

two second detecting means for detecting a peak voltage from an output of each of said second clamping means;

two operational amplifiers each for accepting a detected voltage from one of said first detecting means at one of a noninverting and inverting input terminals and a detected voltage from one of said second detecting means at the other of the inverting input and noninverting terminals, and for differential amplifying the two input voltages;

two means each for providing an offset voltage to one of the noninverting and inverting input terminals of each of said operational amplifiers;

means for producing a constant voltage of a magnitude less than that of the oscillating voltage applied to a said operational amplifier during operation of said oscillating means; and a diode connected to the noninverting or inverting input terminal of one of said operations amplifiers for applying the constant voltage to the noninverting or inverting input terminal of said one of said operational amplifiers when said oscillating means ceases operation to shift the output of the differential amplifier to which the prescribed voltage is applied outside a prescribed voltage range.

15. A torque sensor according to claim 14, wherein:

said first clamping means and said second clamping means each clamp the voltage by applying a bias such that the waveform of the voltage is shifted to the positive voltage side until the maximum negative value of the input voltage becomes equal to 0 V.

* * * * *